United States Patent
Loo et al.

(10) Patent No.: US 11,137,473 B1
(45) Date of Patent: Oct. 5, 2021

(54) INFRA-SOUND ARRAY SYSTEM FOR USE IN DETERMINING GUN SHOTS

(71) Applicant: BOISE STATE UNIVERSITY, Boise, ID (US)

(72) Inventors: Sin Ming Loo, Boise, ID (US); Mark Laverty, Meridian, ID (US)

(73) Assignee: Boise State University, Boise, ID (US)

( * ) Notice: Subject to any disclaimer, the term of this patent is extended or adjusted under 35 U.S.C. 154(b) by 0 days.

(21) Appl. No.: 16/819,828

(22) Filed: Mar. 16, 2020

(51) Int. Cl.
| | |
|---|---|
| *G01S 3/808* | (2006.01) |
| *H04R 1/08* | (2006.01) |
| *H04R 3/00* | (2006.01) |
| *H04R 1/40* | (2006.01) |
| *G10L 25/51* | (2013.01) |

(52) U.S. Cl.
CPC ............ *G01S 3/8083* (2013.01); *G10L 25/51* (2013.01); *H04R 1/083* (2013.01); *H04R 1/406* (2013.01); *H04R 3/005* (2013.01); *H04R 2201/401* (2013.01)

(58) Field of Classification Search
CPC . G01S 5/22; G01S 3/00; G01S 3/8083; G01S 5/20; G01S 3/808; F41G 3/147; G08B 13/1672
See application file for complete search history.

(56) References Cited

U.S. PATENT DOCUMENTS

| | | | | |
|---|---|---|---|---|
| 2002/0181721 | A1* | 12/2002 | Sugiyama | G01H 3/00 381/92 |
| 2006/0256660 | A1* | 11/2006 | Berger | G01S 5/20 367/124 |
| 2016/0192102 | A1* | 6/2016 | Estrada | H04R 5/027 381/26 |

OTHER PUBLICATIONS

Roland B. Stoughton, "SAIC SENTINEL acoustic counter-sniper system," Proc. SPIE 2938, Command, Control, Communications, and Intelligence Systems for Law Enforcement, (Feb. 18, 1997); doi: 10.1117/12.266748 (Year: 1997).*

* cited by examiner

*Primary Examiner* — Kile O Blair
(74) *Attorney, Agent, or Firm* — Parsons Behle & Latimer (57) ABSTRACT

An acoustic goniometer device may include at least four microphones coupled to a collapsible structure. The device may further include a processor configured to receive at least four sound signals from the at least four microphones and to determine a direction of arrival of a sound event within three dimensions based on a time shift between the at least four sound signals. A method may include receiving at least four sound signals from at least four microphones coupled to a collapsible structure and determining a direction of arrival of a sound event within three dimensions based on a time shift between the at least four sound signals.

18 Claims, 7 Drawing Sheets

INFRA-SOUND ARRAY SYSTEM FOR USE IN DETERMINING GUN SHOTS

FIELD OF THE DISCLOSURE

This disclosure is generally related to the field of acoustic goniometry and, in particular, to an infra-sound array system for use in determining gun shots.

BACKGROUND

Acoustic goniometers may rely on differences between time-of-arrival at multiple microphones to detect an angle of arrival of a soundwave. Data from a typical acoustic goniometer can be useful in finding a source of the soundwave. Acoustic goniometers may be particularly useful in finding the source of short, loud noises, such as a gunshot or explosive ordinance.

In general, acoustic goniometers are set up over a wide area and may include multiple components spaced geographically far apart. They may take a long time to set up. Based on the effects of having variable distances between particular microphones, they may have complex configuration procedures to ensure accurate calculations. They often include rudimentary single channel sound processing, which can make it difficult to detect different types of sources of the sounds. In detecting gun shots, typical goniometers may have difficulty in distinguishing between types of guns and/or ammunition. Typical goniometers may have three microphones to determine a two-dimensional direction of arrival.

SUMMARY

Disclose are systems and methods for acoustic goniometry that may overcome one or more of the disadvantages of typical acoustic goniometers. In an embodiment, an acoustic goniometer device includes at least four microphones coupled to a collapsible structure. The device further includes a processor configured to receive at least four sound signals from the at least four microphones and to determine a direction of arrival of a sound event within three dimensions based on a time shift between the at least four sound signals.

In some embodiments, the collapsible structure includes a collapsible tripod having three legs, at least three extension arms pivotably attached respectively to the three legs, where at least three of the at least four microphones are attached respectively to the at least three extension arms, and an extendible tower, where at least one of the at least four microphones is attached to the extendible tower. In some embodiments, the at least four microphones are equidistant from each other to form a tetrahedron while the collapsible structure is in an uncollapsed state. In some embodiments, the at least four microphones are within two meters from each other while the collapsible structure is in an uncollapsed state.

In some embodiments, the device includes at least two amplifiers, where at least one of the at least four microphones is associated with both of the at least two amplifiers. In some embodiments, the at least two amplifiers have different gain values. In some embodiments, the processor is further configured to categorize a source of the sound event. In some embodiments, the sound event is a gunshot sound and categorizing the source of the sound event includes distinguishing between multiple types of weapons. In some embodiments, the processor is configured to measure the time shift between the at least four signals with a sampling period of less than 10 microseconds. In some embodiments, the processor is configured to determine the direction of arrival of an unsuppressed gunshot sound within 100 meters of the at least four microphones. In some embodiments, the at least four microphones are positioned within respective housing structures.

In an embodiment, a method for acoustic goniometry includes receiving at least four sound signals from at least four microphones coupled to a collapsible structure. The method further includes determining a direction of arrival of a sound event within three dimensions based on a time shift between the at least four sound signals.

In some embodiments, the method includes amplifying at least one of the at least four sound signals at a first amplifier and amplifying the at least one of the at least four sound signals at a second amplifier. In some embodiments, the first amplifier and the second amplifier have different gain values. In some embodiments, the method includes categorize a source of the sound event. In some embodiments, the sound event is a gunshot sound and categorizing the source of the sound event includes distinguishing between multiple types of weapons. In some embodiments, the method includes measuring the time shift between the at least four signals with a sampling period of less than 10 microseconds.

In an embodiment, a method for acoustic goniometry includes opening three legs of a tripod and positioning each of the three legs on a surface. The method further includes pivoting three extension arms pivotably attached respectively to the three legs to be parallel to the surface, where at least three microphones are attached respectively to the three legs. The method further includes extending an extendible tower, where at least one microphone is attached to the extendible tower. The method also includes using the at least three microphones attached to the three legs and the at least one microphone attached to the extendible tower to determine a direction of arrival of a sound event within three dimensions.

In some embodiments, the method includes receiving at least four sound signals from the at least three microphones attached to the three legs and the at least one microphone attached to the extendible tower and measuring a time shift between the at least four sound signals. In some embodiments, the method includes categorizing a source of the sound event.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

The disclosed infrasound or acoustic goniometer may be used to determine the direction-of-arrival of certain events of interest, such as gunshots or avalanches. These events of interest may emit a spectrum of frequencies. The goniometer can be configured to filter out other ambient frequencies to focus on just these frequencies of interest. By focusing on just these frequencies, ambient noise such as voices or other everyday events can be filtered out, allowing the goniometer to focus specifically on the unique frequencies that are emitted by the events of interest. The aim of the infrasound/acoustic goniometer is to create an inexpensive, portable goniometer that can be easily and quickly deployed in a variety of environments. If the system is made small enough, such a device could be mounted on top of police cars or other vehicles to provide the emergency personnel with information regarding the direction from which gunshots are being fired.

Figure 1:
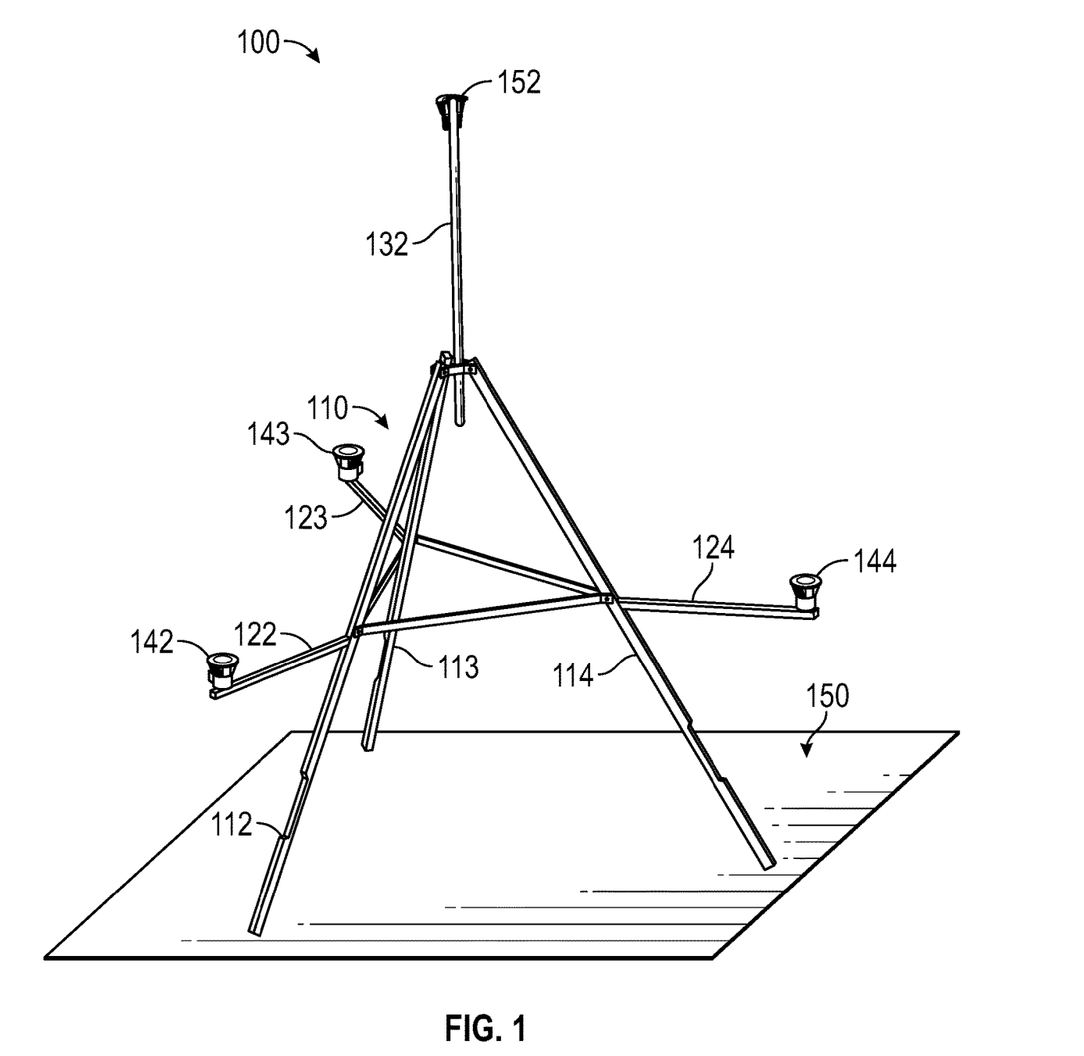
FIG. 1 is a perspective view of an embodiment of an acoustic goniometer device.

Referring to FIG. 1, an embodiment of an acoustic goniometer device 100 is depicted. The device 100 may include a collapsible structure 110 having three legs 112, 113, 114 formed into a tripod. At least three extension arms 122, 123, 124 may be pivotably attached respectively to the three legs 112, 113, 114. Each of the three extension arms 122, 123, 124 may have respective housing structures 142, 143, 144 coupled thereto. A system of microphones, which are not shown in FIG. 1, but are described further herein, may be attached to each of the extension arms 122, 123, 124 and positioned within the housing structures 142, 143, 144. The device 100 may further include an extendible tower 132. Another microphone, which is not shown in FIG. 1, may be attached to the extendible tower 132 and positioned within another housing structure 152.

The collapsible structure 110 may have at least two states including a collapsed state and an uncollapsed state. In the collapsed state, the extension arms 122, 123, 124 may pivot and fold to a position adjacent to each of the legs 112, 113, 114. Each of the legs 112, 113, 114 may fold into a position adjacent to each other. The extendible tower 132 may be lowered in some embodiments by sliding it relative to the legs 112, 113, 114. In other embodiments, the extendible tower 132 may pivot and fold into a position adjacent to the legs 112, 113, 114. Appropriate locking mechanisms may enable the loosening and tightening of the legs 112, 113, 114, the extension arms 122, 123, 124, and the extendible tower 132 to enable them to be moved to and held in the collapsed state.

To place the collapsible structure 110 into the uncollapsed state, the legs 112, 113, 114 may be opened and positioning on a surface 150 to form a tripod. The extension arms 122, 123, 124 may be pivoted to be parallel with the surface 150. The extendible tower 132 may be extended upward from the legs 112, 113, 114. The housing structures 142, 143, 144 and the additional housing structure 152, including their respective microphones may be equidistant from each other to form a tetrahedron while the collapsible structure 110 is in the uncollapsed state. Further, each of the housing structures 142, 143, 144 and the additional housing structure 152 may be within two meters from each other while the collapsible structure 110 is in an uncollapsed state.

As explained further herein, the device 100 may include at least one processor, which is not shown in FIG. 1, but is described further herein, and/or other circuitry to determine the direction of arrival of the sound event, while a system including two implementation of the device 100 may be used to triangulate the origin of a sound event. By having each of the microphones attached to collapsible structure 110, the device 100 may be relatively compact compared to typical goniometer systems. Further, the device 100 may reduce the amount of setup time relative to typical systems. Further, the device 100, by having at least 4 microphones within the housing structures 142, 143, 144, and the additional housing structure 152, may be capable of determining a three-dimensional direction of arrival, including an elevation, unlike typical goniometer systems that can only determine a direction of arrival in two-dimensions.

Figure 2:
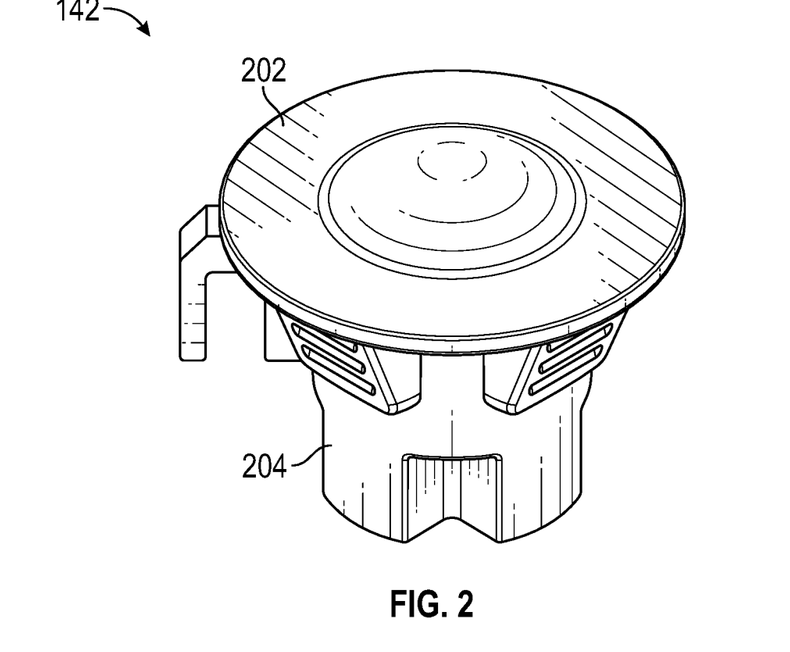
FIG. 2 is a perspective view of an embodiment of a microphone housing.

Referring to FIG. 2, an embodiment of a microphone housing structure 142 is depicted. The housing structure 142 may include a cover 202 and a casing 204. The cover 202 may be sound sensitive, enabling sound to be introduced within the housing structure 142. For example, the cover 202 may be a diaphragm or other structure for transferring sound. The casing 204 may be shaped to acoustically aid in sound reception for a microphone within the housing structure 142.

Figure 3:
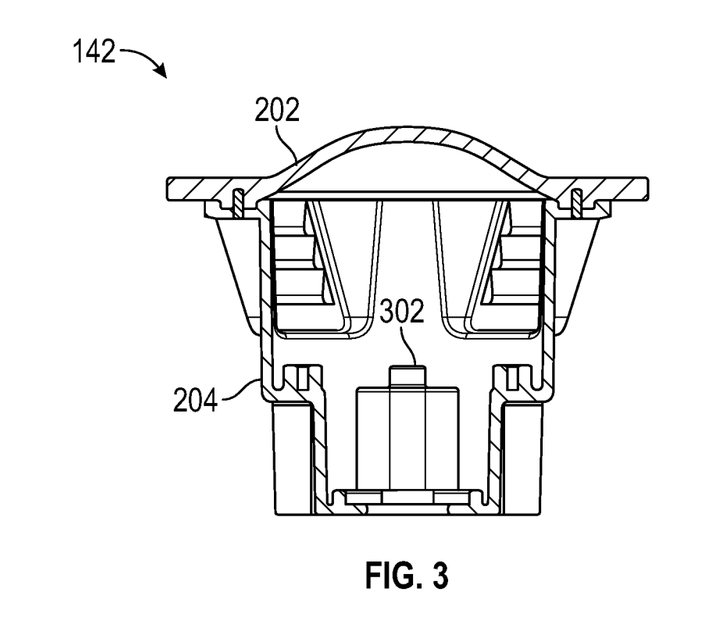
FIG. 3 is a cross-section view of an embodiment of a microphone housing.

Referring to FIG. 3, a cross-section view of an embodiment of a microphone housing structure 142 is depicted. As shown in FIG. 3, when the cover 202 and the casing 204 are coupled together, they may enclose a volume that includes a microphone 302. The microphone 302 may be used in a system to determine the direction of arrival of a sound event, as described herein.

Figure 4:
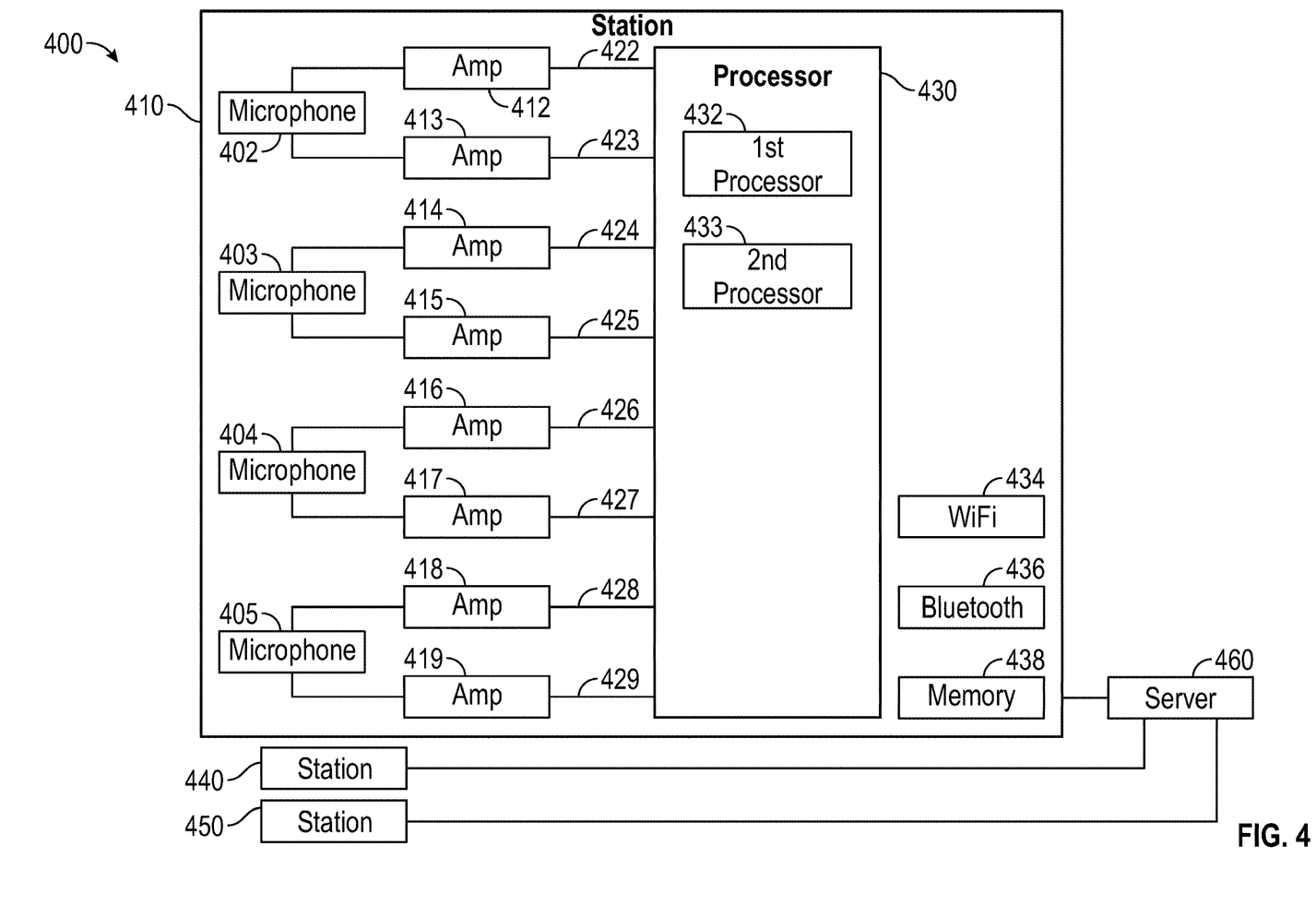
FIG. 4 is a block diagram of an acoustic goniometer system.

Referring to FIG. 4, an embodiment of an acoustic goniometer system 400 is depicted. The system 400 may include a first station 410, a second station 440, and a third station 450. Although three stations are depicted, any number of stations may be used. Further, while only the elements of the first station 410 are described herein, each of the other stations 440, 450 may include the same elements and operate in the same way. The first station 410 may correspond to the acoustic goniometer device 100.

The first station may include at least a first microphone 402, a second microphone 403, a third microphone 404, and a fourth microphone 405. The microphones 402-405 may be positioned respectively within the housing structures 142, 143, 144 and the additional housing structure 152 of FIG. 1. Each of the microphones 402-405 may be coupled to at least two sound processing channels (including amplifier elements). For example, the first microphone 402 may be coupled to a first amplifier 412 and a second amplifier 413, the second microphone 403 may be coupled to a third amplifier 414 and a fourth amplifier 415, the third microphone 404 may be coupled to a fifth amplifier 416 and a sixth amplifier 417, and the fourth microphone 405 may be coupled to a seventh amplifier 418 and an eighth amplifier 419. Thus, each of the microphones 402-405 may be associated with a multi-channel sound input.

The first station 410 may include a processor 430 configured to receive sound signals 422-429 from each of the amplifiers 412-419. For example, a first sound signal 422 and a second sound signal 423 may be received from the first amplifier 412 and the second amplifier 413. A third sound signal 424 and a fourth sound signal 425 may be received from the third amplifier 414 and the fourth amplifier 415. A fifth sound signal 426 and a sixth sound signal 427 may be received from the fifth amplifier 416 and the sixth amplifier 417. A seventh sound signal 428 and an eighth sound signal 429 may be received from the seventh amplifier 418 and the eighth amplifier 419. The amplifiers 412-419 may include operational amplifiers and may be set up in a voltage follower configuration to act as a buffer for outputs of the microphones 402-405.

The processor 430 may be configured to determine a direction of arrival of a sound event within three dimensions based on a time shift between the at least four sound signals. In some embodiments, the processor 430 may include a first processor 432 and a second processor 433. The first processor may read raw data (e.g., the signals 422-429) from the microphones 402-405 and store it to a memory 438. The memory may be configured to hold the raw data and also to hold the goniometry results.

The second processor 433 may detect sound events and perform goniometry on the raw data to determine a direction of arrival. Although the processors 432, 433 are shown as being included in the processor 430, in practice they may be separated and distinct from one another. Further, in some embodiments, more or fewer processors may be used to perform the functions disclosed herein.

The processor 430, and/or one or both of the processors 432, 433 may include a central processing unit (CPU), a graphical processing unit (GPU), a digital signal processor (DSP), a peripheral interface controller (PIC), another type of microprocessor or microcontroller, and/or combinations thereof. Further, the processors 432, 433 may be implemented as integrated circuits, field-programmable gate arrays (FPGAs), application-specific integrated circuit (ASICs), combinations of logic gate circuitry, other types of digital or analog electrical design components, or combinations thereof. The memory 438 may include memory devices such as random-access memory (RAM), read-only memory (ROM), magnetic disk memory, optical disk memory, flash memory, another type of memory capable of storing data and processor instructions, or the like, or combinations thereof.

The first station 410 may further include additional devices for data communication including a wi-fi module 434 and a bluetooth module 436. The wi-fi module 434 may enable communication with a server 460 to communicate detected events, their associated direction of arrival, and an associated timestamp. The bluetooth module 436 may enable a user to pair other devices (not shown) with the station 410. Detected events and their direction of arrival may then be sent via bluetooth. Although not shown in FIG. 4, other network connection devices may also be used.

During operation, the first station 410 may be configured. In order to configure the station 410, the processor 430 may be set to run at its maximum clock speed, a watchdog timer may be set, and a file system may be initialized at the memory 438. A new directory with a time-stamped name may be set up at the memory for storing raw sound data files. At least one analog-digital-converter may be initialized. The analog-digital-converter may be part of the first processor 432, the second processor 433, or both and is not depicted in FIG. 4. After configuration, the first processor 432 may begin to read in the sound signals 422-429 and store them at the memory 438. 1024 samples from each microphone (4096 samples total for 4 microphones, not including multiple channels) may be stored at the memory 468. Once the raw data file reaches a buffer size (e.g., 16 MB), the file may be closed, and a new raw data file may be opened. The raw data may then be loaded into the new file.

The sound received at the microphones 402-405 may be sampled at approximately 20,212 samples per second for each microphone. For each of the microphones 402-405, two amplifiers (e.g., the amplifiers 412, 413) may be configured with different gain values. This may enable the first station 410 to have better sound quality and detection capabilities as compared to typical goniometer devices.

The second processor 433 may read the data and determine whether any of the signals 422-429 drop below a specific threshold voltage. After each of the raw data files is completed, the second processor 433 may determine if any sound events have occurred. For example, if any of the signals 422-429 from any of the microphones 402-405 drop below the threshold voltage, a sound event may be considered to have occurred. The second processor 433 may then gather a "window" of data samples from each of the microphones 402-405. The data window may include data from both before and after the occurrence of the sound event. A goniometry algorithm may be run on the windows of data from each of the microphones 402-405 to determine a direction of arrival of the sound event. The results of the calculations may be sent over wi-fi to the server 460, over bluetooth to a paired device (not shown), and/or to a "results" file stored in the memory 438. After successfully processing an event, the first station 410 may return to monitoring the sound signals 422-429 from the microphones 402-405.

When a sound event occurs, the second processor 433 may retrieve the stored data buffers from the memory 438 to form a window of data around the sound event. The processor 430 may determine which of the microphones 402-405 detected the sound event and may designate it as an "event microphone." The other three microphones may be designated as "non-event microphones." A matched filter may be used to determine a time delay between when the event microphone detected the event and when each of the non-event microphones detected the same event. Based on these time delays, the inter-sensor spacing, the sampling rate of the goniometer, and the speed of sound, a vector may be calculated that points in the direction of the sound event. Based on this vector, the azimuth angle (parallel to the surface 150 of FIG. 1, which may be a surface of the earth) and the elevation angle may be calculated. Depending on configuration settings, an event number and the calculated angles may be written to the memory 438, transmitted via the bluetooth module 436, and/or sent via the wi-fi module 434 to the server 460.

Based on data received from each of the stations 410, 440, 450, the server 460 may be configured to show goniometer location and direction of arrival of detected sound events on location maps and in other formats. The server 460 can also be used to generate configuration files for configuring the stations 410, 440, 450.

A benefit of the system 400 is that a multichannel system may be used for goniometry unlike typical goniometer devices which may be single channel devices. The multiple channels may enable higher quality sound detection which helps the system 400 detect different types of sources for sound events and may help the system 400 to distinguish between types of guns and/or ammunition associated with sound events. Further, by having at least four microphones, the station 410 may determine a three-dimensional direction of arrival. Other benefits of the system 400 may exist. The system 400 may be used to detect and locate potential emergencies such as gunshots in urban areas, avalanches, active poaching, etc.

Figure 5:
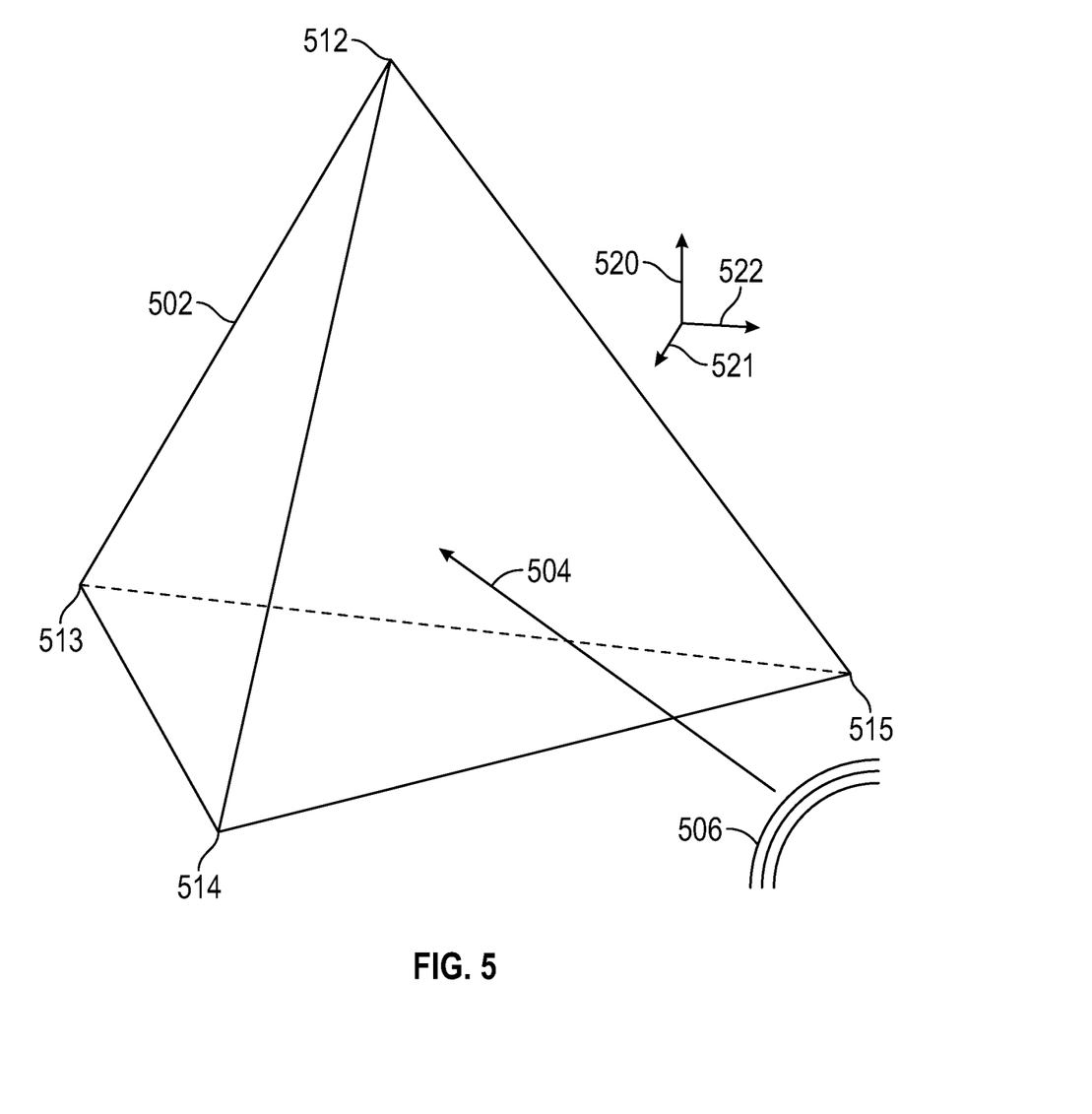
FIG. 5 is a perspective view depicting spacing dimensions of an acoustic goniometer device.

Referring to FIG. 5, spacing dimensions for an acoustic goniometer device are depicted. Microphones (e.g., the microphones 402-405) may be placed at four points 512, 513, 514, 515. The four points 512-515 may form a tetrahedron 502. FIG. 5 also depicts waves 506 from a sound event having a direction of arrival 504. The waves 506 may first reach a first point 515, following shortly by a second point 514 and third and fourth points 512, 513. By measuring a difference between a time of arrival at each of the points 512-515, the direction of arrival 504 may be determined in three dimensions 520, 521, 522.

Figure 6:
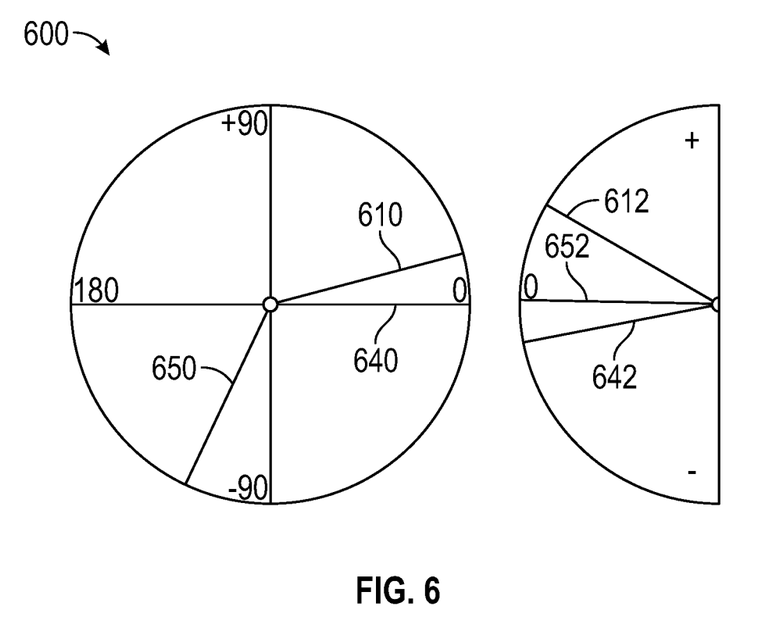
FIG. 6 depicts an embodiment of a graphical representation of acoustic goniometer data.

Referring to FIG. 6, an embodiment of a graphical representation 600 of acoustic goniometer data is depicted. The left circle in FIG. 6 may display azimuth data, while the right semicircle may display elevation data. The graphical representation 600 may be generated by the server 460 (shown in FIG. 4) based on data received from each of the stations 410, 440, 450 (shown in FIG. 4). For example, a first line 610 may represent a two-dimensional direction of arrival (e.g., appx. 18 degrees) at the first station 410. A corresponding second line 612 may represent an elevation angle of arrival (e.g., appx. 30 degrees). Together the first line 610 and the second line 612 represent a three-dimensional direction of arrival at the first station 410. Likewise, a third line 640 and a fourth line 642 may indicate a three-dimensional direction of arrival at the second station 440 and a fifth line 650 and a sixth line 652 may represent a three-dimensional direction of arrival at the third station 450. By knowing the directions of arrival, along with a position of each of the stations 410, 440, 450, a precise location of a sound event may be determined.

Although not shown in FIG. 6, textual direction of arrival information may also be provided. Further, historical direction of arrival information may also be provided (e.g., by using different colored or dimmed lines.

Figure 7:
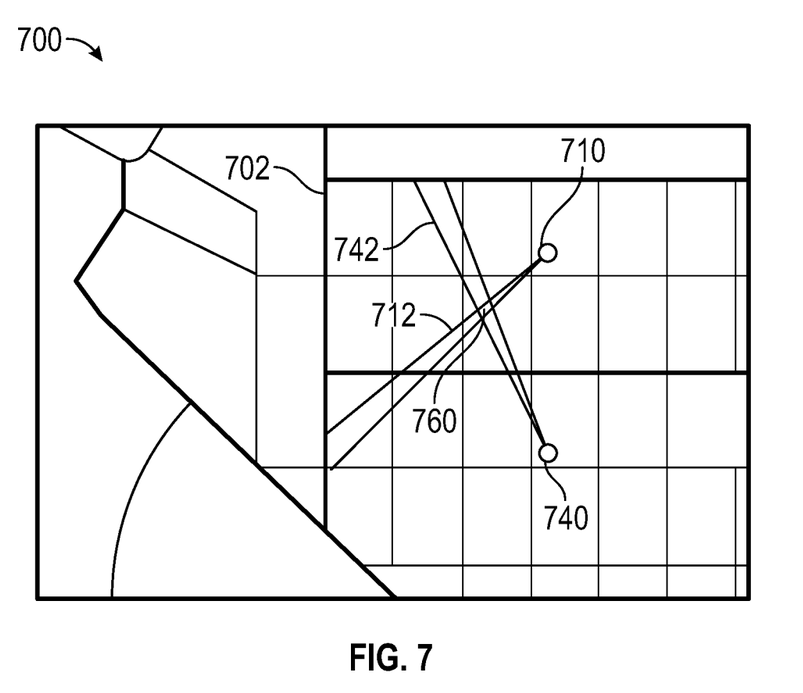
FIG. 7 depicts an embodiment of a graphical representation of acoustic goniometer data.

Referring to FIG. 7, another graphical representation 700 of acoustic goniometer data is depicted. The graphical representation 700 may include a map 702 depicting station locations 710, 740. For example, a first station location 710 may correspond to the first station 410 of FIG. 4 and a second station location 740 may correspond to the second station 440. Although FIG. 7 does not depict a location of the third station 450, in some embodiments, it could be included. Further, the graphical representation 700 may, in some embodiments, only include visual data associated with stations that detect a sound event, while stations that do not detect the sound event may be omitted.

An approximate direction of arrival 712 corresponding to the first station location 710 and an approximate direction of arrival 742 corresponding to the second station location 740 may be depicted. A sound event source area 760 may be determined based on the approximate directions of arrival 712, 742. In the case of an emergency situation (e.g., a gunshot, avalanche, active poaching, etc.) the sound event source area 760 may help emergency responders to quickly locate the source of the sound event.

Figure 8:
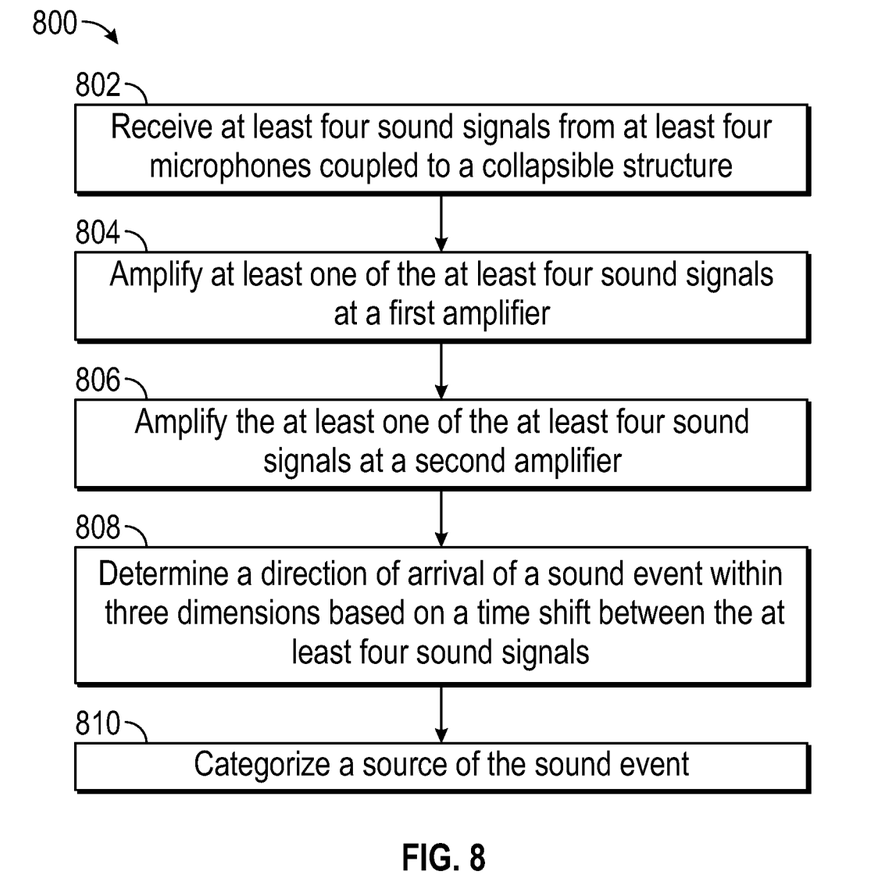
FIG. 8 is a flow chart depicting an embodiment of an acoustic goniometer method.

Referring to FIG. 8, an embodiment of an acoustic goniometer method 800 is depicted. The method 800 may include receiving at least four sound signals from at least four microphones coupled to a collapsible structure, at 802. For example, each of the microphones 402-405 may generate sound signals.

The method 800 may further include amplifying at least one of the at least four sound signals at a first amplifier, at 804. For example, each of the microphones 402-405 may be coupled to at least one amplifier (e.g., the first microphone 402 is coupled to the first amplifier 412).

The method 800 may also include amplifying the at least one of the at least four sound signals at a second amplifier, at 806. For example, a signal from the first microphone 402 may be amplified at the first amplifier 412 and the second amplifier 413 as a multichannel input.

The method 800 may include determining a direction of arrival of a sound event within three dimensions based on a time shift between the at least four sound signals, at 808. For example, the direction of arrival 504 may be calculated in dimensions 520, 521, 522.

The method 800 may include categorizing a source of the sound event, at 810. For example, the multichannel input of the system 400 may enable a source of a sound event to be categorized based on, for example, type of gunshot, avalanche, etc.

An advantage of the method 800 is that by using multichannel sound inputs, the method 800 may more easily detect and distinguish between different types of sound events. Other advantages may exist.

Figure 9:
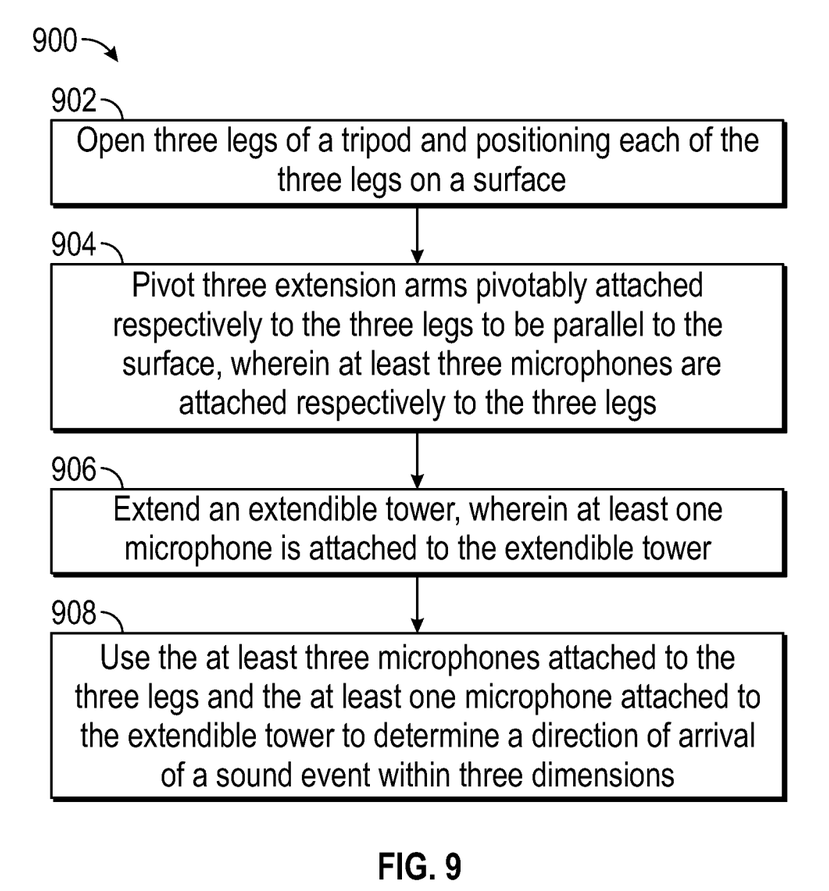
FIG. 9 is a flow chart depicting an embodiment of an acoustic goniometer method.

Referring to FIG. 9, an embodiment of another acoustic goniometer method 900 is depicted. The method 900 may include opening three legs of a tripod and positioning each of the three legs on a surface, at 902. For example, the three legs 112-114 of the collapsible structure 110 may be opened and positioned on the surface 150, which may be the ground, for example.

The method 900 may further include pivoting three extension arms pivotably attached respectively to the three legs to be parallel to the surface, where at least three microphones are attached respectively to the three legs, at 904 For example, the three extension arms 122-124 may be pivoted to be approximately parallel to the surface 150.

The method 900 may also include extending an extendible tower, where at least one microphone is attached to the extendible tower, at 906. For example, the extendible tower 132 may be raised.

The method 900 may include using the at least three microphones attached to the three legs and the at least one microphone attached to the extendible tower to determine a direction of arrival of a sound event within three dimensions, at 908. For example, the microphones 402-405, which may be, respectively, housed within the housing structures 142-144 and within the additional housing structure 152, may be used to determine the direction of arrival 504 of a sound event.

An advantage of the method 900, is that a compact and portable structure may be used for supporting a goniometer device. Other benefits may exist.

Although various embodiments have been shown and described, the present disclosure is not so limited and will be understood to include all such modifications and variations as would be apparent to one skilled in the art.

What is claimed is:

1. An acoustic goniometer device comprising:
   at least four microphones coupled to a collapsible structure, wherein the collapsible structure comprises a collapsible tripod having three legs and at least one extension arm pivotably attached to at least one of the three legs, and wherein at least one microphone of the four microphones is attached to the at least one extension arm; and
   a processor configured to receive at least four sound signals from the at least four microphones and to determine a direction of arrival of a sound event within three dimensions based on a time shift between the at least four sound signals.

2. The device of claim 1, wherein the collapsible structure comprises:
   at least three extension arms, inclusive of the at least one extension arm, pivotably attached respectively to the three legs, wherein at least three of the at least four microphones, inclusive of the at least one microphone, are attached respectively to the at least three extension arms; and
   an extendible tower, wherein at least one of the at least four microphones is attached to the extendible tower.

3. The device of claim 1, wherein the at least four microphones are equidistant from each other to form a tetrahedron while the collapsible structure is in an uncollapsed state.

4. The device of claim 1, wherein the at least four microphones are within two meters from each other while the collapsible structure is in an uncollapsed state.

5. The device of claim 1, further comprising:
   at least two amplifiers, wherein at least one of the at least four microphones is associated with both of the at least two amplifiers.

6. The device of claim 1, wherein the processor is further configured to categorize a source of the sound event.

7. The device of claim 6, wherein the sound event is a gunshot sound and wherein categorizing the source of the sound event comprises distinguishing between multiple types of weapons.

8. The device of claim 1, wherein the processor is configured to measure the time shift between the at least four sound signals with a sampling period of less than 10 microseconds.

9. The device of claim 1, wherein the processor is configured to determine the direction of arrival of an unsuppressed gunshot sound within 100 meters of the at least four microphones.

10. The device of claim 1, wherein the at least four microphones are positioned within respective housing structures.

11. A method for acoustic goniometry comprising:
    receiving at least four sound signals from at least four microphones coupled to a collapsible structure, wherein the collapsible structure comprises a collapsible tripod having three legs and at least three extension arms pivotably attached respectively to the three legs, and wherein at least three of the at least four microphones are attached respectively to the at least three extension arms; and
    determining a direction of arrival of a sound event within three dimensions based on a time shift between the at least four sound signals.

12. The method of claim 11, further comprising:
    amplifying at least one of the at least four sound signals at a first amplifier; and
    amplifying the at least one of the at least four sound signals at a second amplifier.

13. The method of claim 11, further comprising:
    categorizing a source of the sound event.

14. The method of claim 13, wherein the sound event is a gunshot sound and wherein categorizing the source of the sound event comprises distinguishing between multiple types of weapons.

15. The method of claim 11, further comprising:
    measuring the time shift between the at least four sound signals with a sampling period of less than 10 microseconds.

16. A method for acoustic goniometry comprising:
    opening three legs of a tripod and positioning each of the three legs on a surface;
    pivoting three extension arms pivotably attached respectively to the three legs to be parallel to the surface, wherein at least three microphones are attached respectively to the three legs;
    extending an extendible tower, wherein at least one microphone is attached to the extendible tower; and
    using the at least three microphones attached to the three legs and the at least one microphone attached to the extendible tower to determine a direction of arrival of a sound event within three dimensions.

17. The method of claim 16, further comprising:
    receiving at least four sound signals from the at least three microphones attached to the three legs and the at least one microphone attached to the extendible tower; and
    measuring a time shift between the at least four sound signals.

18. The method of claim 16, further comprising:
    categorizing a source of the sound event.

* * * * *